US011922851B2

(12) United States Patent
Ren et al.

(10) Patent No.: US 11,922,851 B2
(45) Date of Patent: Mar. 5, 2024

(54) METHOD, DEVICE AND APPARATUS FOR DETERMINING COMPENSATION GRAYSCALE

(71) Applicant: KUNSHAN NEW FLAT PANEL DISPLAY TECHNOLOGY CENTER CO., LTD., Jiangsu (CN)

(72) Inventors: Chunhui Ren, Kunshan (CN); Xiaokang Zhou, Kunshan (CN)

(73) Assignee: KUNSHAN NEW FLAT PANEL DISPLAY TECHNOLOGY CENTER CO., LTD., Kunshan (CN)

( * ) Notice: Subject to any disclaimer, the term of this patent is extended or adjusted under 35 U.S.C. 154(b) by 0 days.

(21) Appl. No.: 18/297,252

(22) Filed: Apr. 7, 2023

(65) Prior Publication Data

US 2023/0245611 A1 Aug. 3, 2023

Related U.S. Application Data

(63) Continuation of application No. PCT/CN2021/117114, filed on Sep. 8, 2021.

(30) Foreign Application Priority Data

Dec. 11, 2020 (CN) ........................ 202011437349.3

(51) Int. Cl.
*G09G 3/20* (2006.01)

(52) U.S. Cl.
CPC ... *G09G 3/2074* (2013.01); *G09G 2320/0233* (2013.01); *G09G 2320/0276* (2013.01); *G09G 2360/16* (2013.01)

(58) Field of Classification Search
CPC .. G09G 3/3607; G09G 3/2074; G09G 3/2003; G09G 2320/0233; G09G 2320/0276; G09G 2360/16
See application file for complete search history.

(56) References Cited

U.S. PATENT DOCUMENTS

2017/0193928 A1* 7/2017 Deng ..................... G09G 3/006
2020/0126484 A1* 4/2020 Yan ...................... G09G 3/3258
2021/0201849 A1* 7/2021 Choi ....................... G09G 3/20

FOREIGN PATENT DOCUMENTS

CN 1615029 A 5/2005
CN 101282425 A 10/2008
(Continued)

OTHER PUBLICATIONS

International Search Report dated Nov. 22, 2021, in corresponding application No. PCT/CN2021/117114; 6 ogs.
(Continued)

*Primary Examiner* — Hang Lin
(74) *Attorney, Agent, or Firm* — Maier & Maier, PLLC

(57) ABSTRACT

A method includes: dividing a display area of a display panel into multiple sub-display areas distributed in an array; selecting at least two sub-display areas as reference sub-display areas, the reference sub-display areas being adjacent and one reference sub-display area includes a target sub-pixel to be compensated; determining a weight factor for each reference sub-display area according to a distance between a center point of the target sub-pixel and a center point of the reference sub-display area and a distance between center points of adjacent reference sub-display areas; calculating a weighted sum of average luminance values of the reference sub-display areas under a target grayscale value with the weight factors for the reference sub-display areas to obtain a target luminance value of the target sub-pixel under the target grayscale value; determining a compensation grayscale value of the target sub-pixel under the target grayscale value according to the target luminance value.

14 Claims, 7 Drawing Sheets

(56) References Cited

FOREIGN PATENT DOCUMENTS

| | | | |
|---|---|---|---|
| CN | 105070273 | A | 11/2015 |
| CN | 105206239 | A | 12/2015 |
| CN | 106328053 | A | 1/2017 |
| CN | 109493814 | A | 3/2019 |
| CN | 110444157 | A | 11/2019 |
| CN | 110992887 | A | 4/2020 |
| CN | 111816113 | A | 10/2020 |
| CN | 112530346 | A | 3/2021 |

OTHER PUBLICATIONS

Chinese Office Action dated Feb. 17, 2022, in corresponding application No. 202011437349.3; 27 pgs.

* cited by examiner

METHOD, DEVICE AND APPARATUS FOR DETERMINING COMPENSATION GRAYSCALE

CROSS-REFERENCE TO RELATED APPLICATIONS

This application is a continuation of International Application No. PCT/CN2021/117114, filed on Sep. 8, 2021, which claims priority to Chinese Patent Application No. 202011437349.3, entitled "METHOD, DEVICE AND APPARATUS FOR DETERMINING COMPENSATION GRAYSCALE", filed Dec. 11, 2020, both of which are incorporated herein by reference in their entireties.

TECHNICAL FIELD

The present application relates to the field of display technology, and in particular to a method, device, and apparatus for determining a compensation grayscale.

BACKGROUND

During the displaying of a display panel, a Mura phenomenon may occur, which degrades the display effect of the display panel. In order to avoid occurring of the Mura phenomenon, a Demura compensation may be performed on the display panel.

In the process of performing the Demura compensation on the display panel, a luminance acquisition device can be used to acquire luminance data of the display panel. However, due to problems with consistency and stability of the luminance acquisition device, the luminance data acquired by the luminance acquisition device may be not accurate enough. As a result, after the Demura compensation is performed based on the luminance data acquired by the luminance collection device, the display panel still has the problem of color deviation.

SUMMARY

Embodiments of the present application provides a method, device, and apparatus for determining a compensation grayscale, which can improve performance of the display panel to address the problem of color deviation.

In the first aspect, the embodiments of the present application provide a method for determining a compensation grayscale, including: dividing a display area of a display panel into a plurality of sub-display areas distributed in an array; selecting at least two sub-display areas from the plurality of sub-display areas as reference sub-display areas, wherein the reference sub-display areas are adjacent to each other and one of the reference sub-display areas includes a target sub-pixel to be compensated; determining a weight factor for each of the reference sub-display areas according to a distance between a center point of the target sub-pixel and a center point of each reference sub-display area and a distance between center points of adjacent reference sub-display areas; calculating a weighted sum of average luminance values of the reference sub-display areas under a target grayscale value with the weight factors for the reference sub-display areas to obtain a target luminance value of the target sub-pixel under the target grayscale value; determining a compensation grayscale value of the target sub-pixel under the target grayscale value according to the target luminance value.

In the second aspect, the embodiments of the present application provide an apparatus for determining a compensation grayscale, including:

an area division module configured to divide a display area of a display panel into a plurality of sub-display areas distributed in an array;

a reference area determination module configured to select at least two sub-display areas from the plurality of sub-display areas as reference sub-display areas, wherein the reference sub-display areas are adjacent to each other and one of the reference sub-display areas includes a target sub-pixel to be compensated;

a weight determination module configured to determine a weight factor for each of the reference sub-display areas according to a distance between a center point of the target sub-pixel and a center point of each reference sub-display area and a distance between center points of adjacent reference sub-display areas;

a target luminance determination module configured to calculate a weighted sum of average luminance values of the reference sub-display areas under a target grayscale value with the weight factors for the reference sub-display areas to obtain a target luminance value of the target sub-pixel under the target grayscale value;

a compensation grayscale determination module configured to determine a compensation grayscale value of the target sub-pixel under the target grayscale value according to the target luminance value.

In the third aspect, the embodiments of the present application provide a device for determining a compensation grayscale, including a processor and a memory having computer program instructions stored thereon, wherein the processor, when executing the computer program instructions, implements the method according to the first aspect.

According to the embodiments of the present application, the target luminance value of the target sub-pixel to be compensated under the target grayscale value is determined according to a weighted sum of the average luminance values of the reference sub-display areas with the weight factors for the reference sub-display areas, the reference sub-display areas are adjacent to each other and one of the reference sub-display areas includes the target sub-pixel, that is, the reference sub-display areas are located around the target sub-pixel, and the weight factor for each of the reference sub-display areas is determined according to a distance between a center point of the target sub-pixel and a center point of each reference sub-display area and a distance between center points of adjacent reference sub-display areas. Therefore, it may be possible to avoid taking the average luminance value determined by the luminance data acquired by the luminance acquisition device as the target luminance value, and thus avoid overcompensation for the sub-pixels at two ends of the same row so as to address the problem of color deviation of the display panel.

BRIEF DESCRIPTION OF THE DRAWINGS

Other features, objects, and advantages of the present application will become more apparent from the following detailed description of non-limiting embodiments with reference to the accompanying drawings, in which like or similar reference characters refer to the same or similar features, and the drawings are not necessarily drawn to scale.

DETAILED DESCRIPTION

Features and exemplary embodiments of various aspects of the present application will be described in detail below. In order to make the objects, technical solutions, and advantages of the present application clear, the present application will be further described in detail below in conjunction with the drawings and embodiments. It should be understood that the specific embodiments described herein are only configured for explaining the present application, and not configured for limiting the present application. For a person skilled in the art, the present application may be implemented without some of these specific details. The following descriptions of the embodiments are merely to provide a better understanding of the present application by illustrating the examples of the present application.

Figure 1:
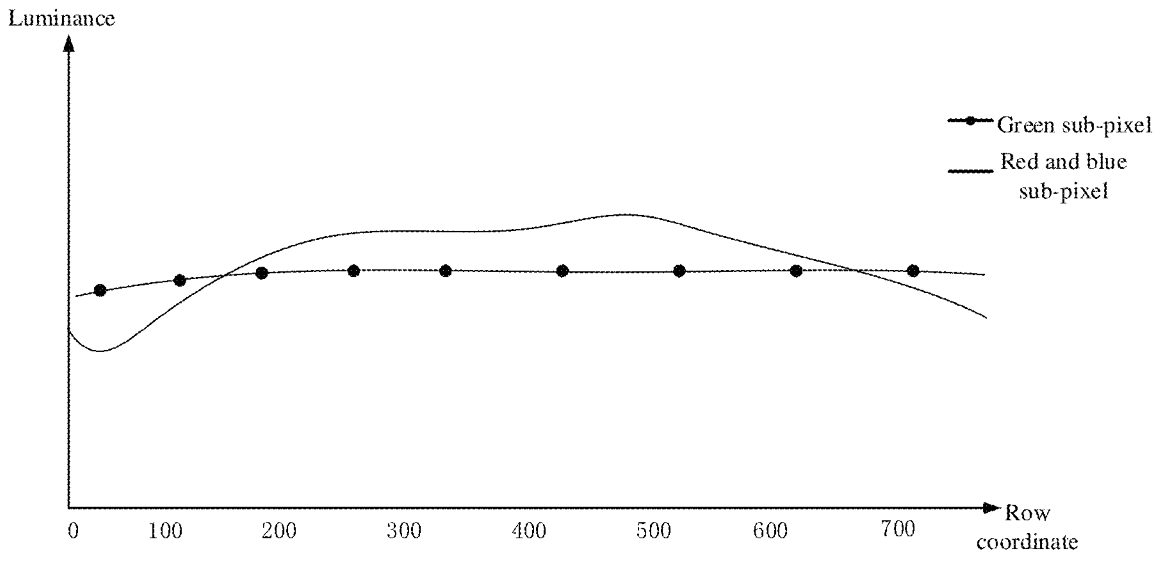
FIG. 1 shows a schematic diagram of luminance curves of sub-pixels of each color in a row of a display panel according to an embodiment of the present application.

During the process of compensating the display panel, it is observed that the compensated display panel still has the problem of color deviation, for example, two sides of the compensated display panel are purple. Research about the reason of this problem has been conducted. FIG. 1 shows a schematic diagram of luminance curves of sub-pixels of each color in a row of a display panel according to an embodiment of the present application. Exemplarily, the display panel includes red sub-pixels, green sub-pixels, and blue sub-pixels. FIG. 1 shows the luminance data of red sub-pixels, green sub-pixels, and blue sub-pixels in the middle row of the display panel acquired by the luminance acquisition device at the grayscale 224. Due to inaccuracy of the luminance data acquired by the luminance acquisition device, as shown in FIG. 1, the curve of the luminance data of the red sub-pixels and the blue sub-pixels acquired by the luminance acquisition device has an obvious arc trend, that is, the luminance values of the red sub-pixels at two ends of the row are lower than the luminance values of the red sub-pixels in the middle of the row, the luminance values of the blue sub-pixels at two ends of the row are lower than the luminance values of the blue sub-pixels in the middle of the row, and the luminance data change of the green sub-pixels is relatively gentle. Actually, the luminance data changes of the red sub-pixels, green sub-pixels and blue sub-pixels in the same row are relatively gentle, and there is no obvious arc trend for the red sub-pixels and blue sub-pixels shown in FIG. 1. In the process of Demura compensation on the display panel, an average luminance value of the display panel is usually used as a target luminance value and the luminance of the red sub-pixels and blue sub-pixels at two ends of the same row is increased to the target luminance value, which may cause overcompensation for the red sub-pixels and blue sub-pixels but may not change the luminance of the green sub-pixels much. Thus, the compensated display panel still has color deviation, for example, causing the sides of the compensated display panel to turn purple.

In order to solve the above problem, the embodiments of the present application provide a method for determining a compensation grayscale, a device for determining a compensation grayscale, an apparatus for determining a compensation grayscale, and a computer storage medium. Various embodiments of the method, device, and apparatus for determining the compensation grayscale will be described below in conjunction with the accompanying drawings.

An embodiment of the present application provides a compensation grayscale determination method for determining a compensation grayscale value of a display panel. The display panel may be an organic light emitting diode (OLED) display panel.

Figure 2:
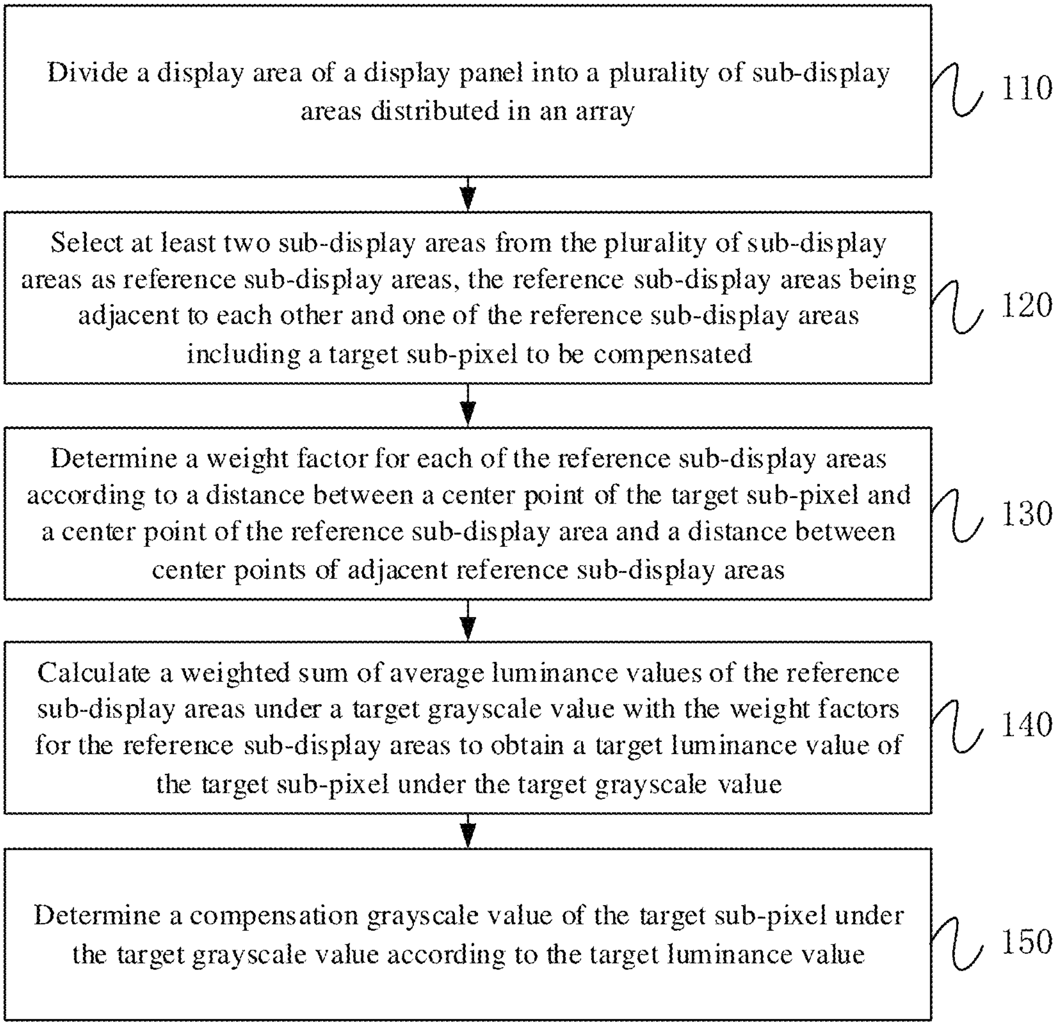
FIG. 2 shows a schematic diagram of a flowchart of a method for determining a compensation grayscale according to an embodiment of the present application.

FIG. 2 shows a schematic diagram of a flowchart of a method for determining a compensated grayscale according to an embodiment of the present application. As shown in FIG. 2, the method for determining the compensation grayscale provided by the embodiment of the present application includes step 110 to step 150.

Step 110: dividing a display area of a display panel into a plurality of sub-display areas distributed in an array.

Step 120: selecting at least two sub-display areas from the plurality of sub-display areas as reference sub-display areas. The reference sub-display areas are adjacent to each other and one of the reference sub-display areas includes a target sub-pixel to be compensated.

Step 130: determining a weight factor for each of the reference sub-display areas according to a distance between a center point of the target sub-pixel and a center point of each reference sub-display area and a distance between center points of adjacent reference sub-display areas.

Step 140: calculating a weighted sum of average luminance values of the reference sub-display areas under a target grayscale value with the weight factors for the reference sub-display areas to obtain a target luminance value of the target sub-pixel under the target grayscale value.

Step 150: determining a compensation grayscale value of the target sub-pixel under the target grayscale value according to the target luminance value.

According to the embodiments of the present application, the target luminance value of the target sub-pixel to be compensated under the target grayscale value is determined according to a weighted sum of the average luminance values of the reference sub-display areas with the weight factors for the reference sub-display areas, the reference sub-display areas are adjacent to each other and one of the reference sub-display areas includes the target sub-pixel, that is, the reference sub-display areas are located around the target sub-pixel, and the weight factor for each of the reference sub-display areas is determined according to a distance between a center point of the target sub-pixel and a center point of each reference sub-display area and a distance between center points of adjacent reference sub-display areas. Therefore, it may be possible to avoid taking the average luminance value determined by luminance data acquired by the luminance acquisition device as the target luminance value, and thus avoid overcompensation for the sub-pixels at two ends of the same row so as to address the problem of color deviation of the display panel.

In step 110, the shape of the sub-display area may be a regular polygon, such as a rectangle, a regular pentagon, a regular hexagon, and the like. Exemplarily, the sub-display areas may be rectangular areas each having equal lengths and equal widths. By dividing the display area of the display panel into a plurality of rectangular sub-display areas distributed in an array, the selection of the reference sub-display areas and the calculation of the weight factors can be easily completed, and the selected reference sub-display areas can be more in line with an actual luminance of the target sub-pixel.

In an example, step 110 may include dividing the display area of the display panel into the sub-display areas distributed in an array of m rows and n columns, where m and n are both positive integers greater than or equal to 2. In some optional embodiments, values of m and n may be set from small to large until the display panel has no color deviation under the values of m and n, thereby reducing the amount of calculation.

In step 130, the distance between the center point of the target sub-pixel and the center point of each of the reference sub-display areas may be the distance between the center point of the target sub-pixel and the center point of each reference sub-display area in at least one direction of a row direction and a column direction. The distance between the center points of adjacent reference sub-display areas may be the distance between the center points of the adjacent reference sub-display areas in at least one direction of the row direction and the column direction.

For example, assuming the sub-display areas are rectangular areas each having equal lengths and equal widths, in some optional embodiments, the target sub-pixel is located in a first rectangular area formed by taking the center points of four sub-display areas in two rows and two columns as vertices. Step 120 may specifically include selecting four sub-display areas from the plurality of sub-display areas as the reference sub-display areas. Here, the four sub-display areas having the center points that are respectively four vertices of the first rectangular area are selected as the reference sub-display areas.

That is to say, the target sub-pixel is located in a non-edge area of the display panel. In this way, the four sub-display areas that are close to the target sub-pixel can be selected as the reference sub-display areas, so that when determining the target luminance value of the target sub-pixel, influences in both the row direction and the column direction can be considered so as to ensure the accuracy of the determined target luminance value.

In an example, the target sub-pixel may be any sub-pixel in the display panel, and the positions of the reference sub-display areas corresponding to the target sub-pixels at different positions may be different.

In some optional embodiments, in step 130, the weight factor for each of the reference sub-display areas may be calculated according to formula (1):

$$f=\left(1-\frac{h}{H}\right)\times\left(1-\frac{v}{V}\right) \qquad \text{formula (1)}$$

Here, f represents the weight factor, h represents a distance between the center point of the target sub-pixel and the center point of each reference sub-display area in a row direction, H represents a distance between center points of adjacent reference sub-display areas in the row direction, v represents a distance between the center point of the target sub-pixel and the center point of each reference sub-display area in a column direction, and V represents a distance between center points of adjacent reference sub-display areas in the column direction.

When determining the weight factor for the reference sub-display area, instead of directly taking the reciprocal of the distance between the center point of the target sub-pixel and the center point of each reference sub-display area or the square of the reciprocal of the distance as the weight factor, as shown by the above formula (1), the weight factor is determined by the distances between the center point of the target sub-pixel and the center point of each reference sub-display area in the row direction and in the column direction and the distances between the center points of adjacent reference sub-display areas in the row direction and in the column direction. In this way, the influence degree in the row direction and the influence degree in the column direction can be considered separately, and the influence degree in the row direction and the influence degree in the column direction can be combined to obtain the final weight factor, so as to ensure the accuracy of the obtained weight factor.

Figure 3:
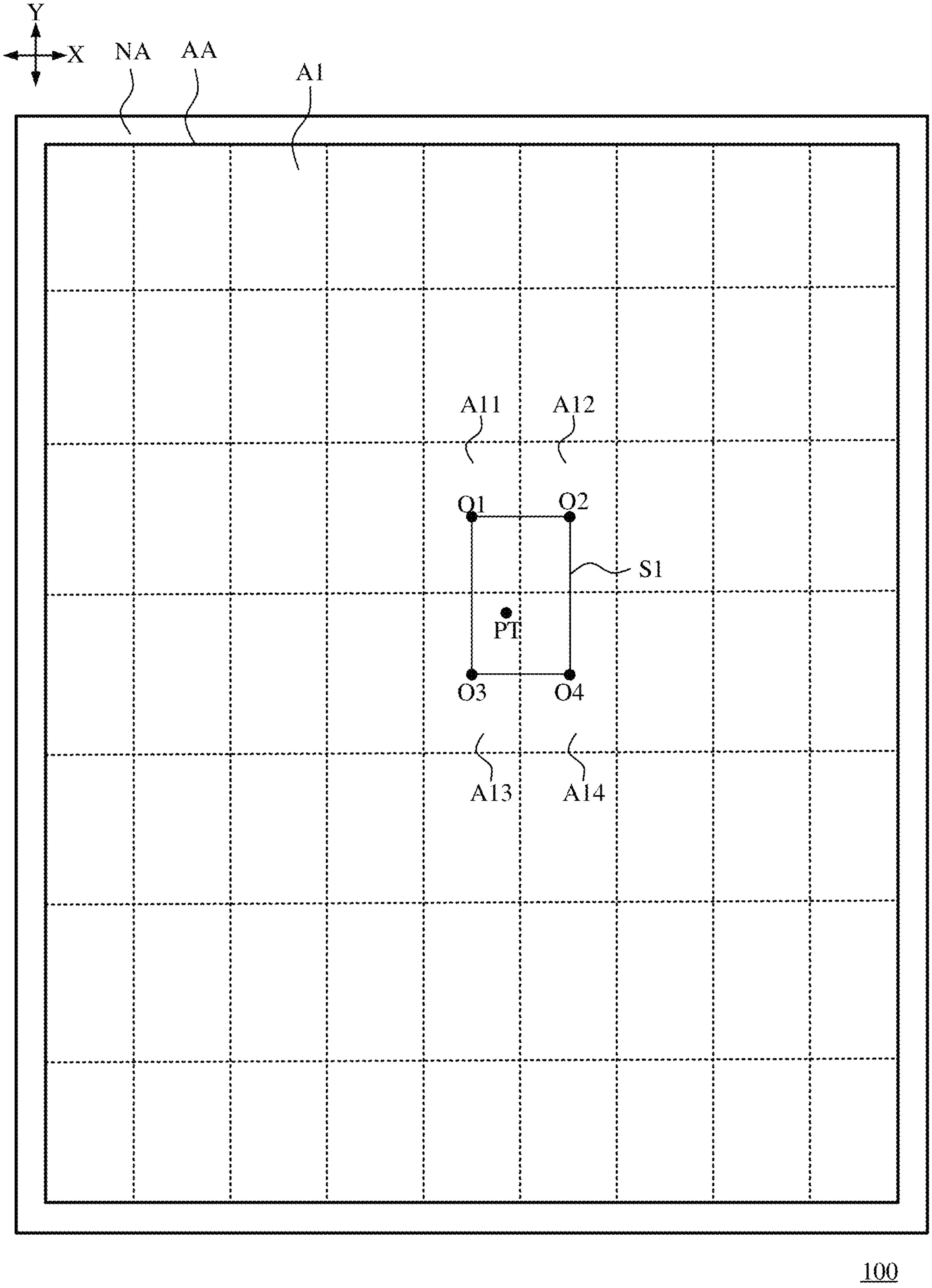
FIG. 3 shows a schematic diagram of selection of reference sub-display areas according to an embodiment of the present application.

FIG. 3 shows a schematic diagram of selection of reference sub-display areas according to an embodiment of the present application. As an example, the display panel 100 includes a display area AA and a non-display area NA. FIG. 3 exemplarily shows that the display area AA of the display panel is divided into sub-display areas A1 of 7 rows and 9 columns. The sub-display areas of 2 rows and 2 columns are respectively the first reference sub-display area A11, the second reference sub-display area A12, the third reference sub-display area A13 and the fourth reference sub-display area A14. The center points of the first reference sub-display area A11, the second reference sub-display area A12, the third reference sub-display area A13 and the fourth reference sub-display area A14 are O1, O2, O3 and O4 respectively, and the first rectangular area S1 is formed by taking O1, O2, O3 and O4 as four vertices. The target sub-pixel PT is located in the first rectangular area S1.

As known from the above formula (1), the weight factor for the first reference sub-display area A11 may be calculated according to formula (1.1):

$$f_1=\left(1-\frac{h_1}{H}\right)\times\left(1-\frac{V_1}{V}\right) \qquad \text{formula (1.1)}$$

As known from the above formula (1), the weight factor for the second reference sub-display area A12 may be calculated according to formula (1.2):

$$f_2=\left(1-\frac{h_2}{H}\right)\times\left(1-\frac{V_2}{V}\right) \qquad \text{formula (1.2)}$$

As known from the above formula (1), the weight factor for the third reference sub-display area A13 may be calculated according to formula (1.3):

$$f_3=\left(1-\frac{h_3}{H}\right)\times\left(1-\frac{V_3}{V}\right) \qquad \text{formula (1.3)}$$

As known from the above formula (1), the weight factor for the fourth reference sub-display area A14 may be calculated according to formula (1.4):

$$f_4=\left(1-\frac{h_4}{H}\right)\times\left(1-\frac{V_4}{V}\right) \quad \text{formula (1.4)}$$

Here, $f_1$ represents the weight factor of the first reference sub-display area A11, $h_1$ represents a distance between the center point of the target sub-pixel PT and the center point O1 of the first reference sub-display area A11 in the row direction X, $V_1$ represents a distance between the center point of the target sub-pixel PT and the center point O1 of the first reference sub-display area A11 in the column direction Y. $f_2$ represents the weight factor of the second reference sub-display area A12, $h_2$ represents a distance between the center point of the target sub-pixel PT and the center point O2 of the second reference sub-display area A12 in the row direction X, $V_2$ represents a distance between the center point of the target sub-pixel PT and the center point O2 of the second reference sub-display area A12 in the column direction Y. $f_3$ represents the weight factor of the third reference sub-display area A13, $h_3$ represents a distance between the center point of the target sub-pixel PT and the center point O3 of the third reference sub-display area A13 in the row direction X, $V_3$ represents a distance between the center point of the target sub-pixel PT and the center point O3 of the third reference sub-display area A13 in the column direction Y. $f_4$ represents the weight factor of the fourth reference sub-display area A14, $h_4$ represents a distance between the center point of the target sub-pixel PT and the center point O4 of the fourth reference sub-display area A14 in the row direction X, $V_4$ represents a distance between the center point of the target sub-pixel PT and the center point O4 of the fourth reference sub-display area A14 in the column direction Y.

In some optional embodiments, still assuming there are four reference sub-display areas, e.g. the first reference sub-display area A11, the second reference sub-display area A12, the third reference sub-display area A13 and the fourth reference sub-display area A14, in step 140, the target luminance value of the target sub-pixel under the target grayscale value may be calculated according to formula (2):

$$L_X=L_1\times f_1+L_2\times f_2+L_3\times f_3+L_4\times f_4 \quad \text{formula (2)}$$

Here, $L_X$ represents the target luminance value, $L_1$ represents an average luminance value of the first reference sub-display area, $f_1$ represents a weight factor for the first reference sub-display area, and $L_2$ represents an average luminance value of the second reference sub-display area, $f_2$ represents a weight factor for the second reference sub-display area, $L_3$ represents an average luminance value of the third reference sub-display area, $f_3$ represents a weight factor for the third reference sub-display area, $L_4$ represents an average luminance value of the fourth reference sub-display area, $f_4$ represents a weight factor for the fourth reference sub-display area.

The target luminance value is determined according to formula (2), which can reduce the influence caused by inaccuracy of the luminance acquisition device, then in the subsequent compensation process, can avoid overcompensation for the sub-pixels at two ends of the same row, and can address the problem of color deviation of the display panel.

In an example, before step 140, the method for determining the compensation grayscale provide by the embodiments of the present application may further include: acquiring a luminance value of each sub-pixel in each of the reference sub-display areas under the target grayscale value; determining the average luminance value of each of the reference sub-display areas according to the luminance value of each sub-pixel in the reference sub-display area under the target grayscale value. The luminance values of the sub-pixels in each of the reference sub-display areas under the target grayscale value may be summed, and a ratio of the sum of the luminance values to the number of the sub-pixels may be calculated to obtain the average luminance value of the reference sub-display area. Alternatively, the luminance values having an obvious deviation may be filtered, and a ratio of a sum of the luminance values left after filtering to the number of the luminance values left after filtering may be calculated to obtain the average luminance value of each of the reference sub-display areas.

In an example, the target grayscale value may be any grayscale value that can be displayed by the display panel. For example, the range of grayscales that can be displayed by the display panel is 0 to 255, and the target grayscale value can be any value in the range of 0 to 255. For example, in the process of determining the compensation grayscale of the display panel, the compensation grayscales under some specified grayscale binding points may be determined first, and then the compensation grayscales corresponding to the grayscales other than the grayscale binding points may be determined by linear interpolation. Specifically, the target grayscale value may be any one of grayscale 32, grayscale 64, grayscale 96, grayscale 128, grayscale 160, grayscale 192, grayscale 224, and grayscale 255.

Specifically, after the display panel is lit, an optical measurement device such as a color analyzer, or a high-resolution and high-precision camera such as a charge coupled device (CCD) camera can be used to capture pictures of the display panel to generate luminance data. The entire display area of the display panel may be captured, that is, the captured area includes the entire display area, but only luminance data corresponding to the reference sub-display areas may be used in the subsequent process. Alternatively, it is also possible to only capture pictures of the reference sub-display areas of the display panel, that is, the captured area only includes the target display area.

For example, still assuming that the sub-display areas are the rectangular areas each having equal lengths and equal widths, in some optional embodiments, the target sub-pixel is located in a second rectangular area formed by a line connecting the center points of two adjacent sub-display areas and an edge of the display area parallel to the line. Step 120 may specifically include selecting two sub-display areas from the plurality of sub-display areas as the reference sub-display areas. Here, the two sub-display areas having the center points that are respectively two endpoints of the line are selected as the reference sub-display areas.

That is to say, the target sub-pixel is located in an edge area of the display panel. In this way, two sub-display areas that are close to the target sub-pixel can be selected as reference sub-display areas, so that only the influence of the two sub-display areas close to the target sub-pixel is considered when determining the target luminance value of the target sub-pixel and thus ensure the accuracy of the determined target luminance value.

Figure 4:
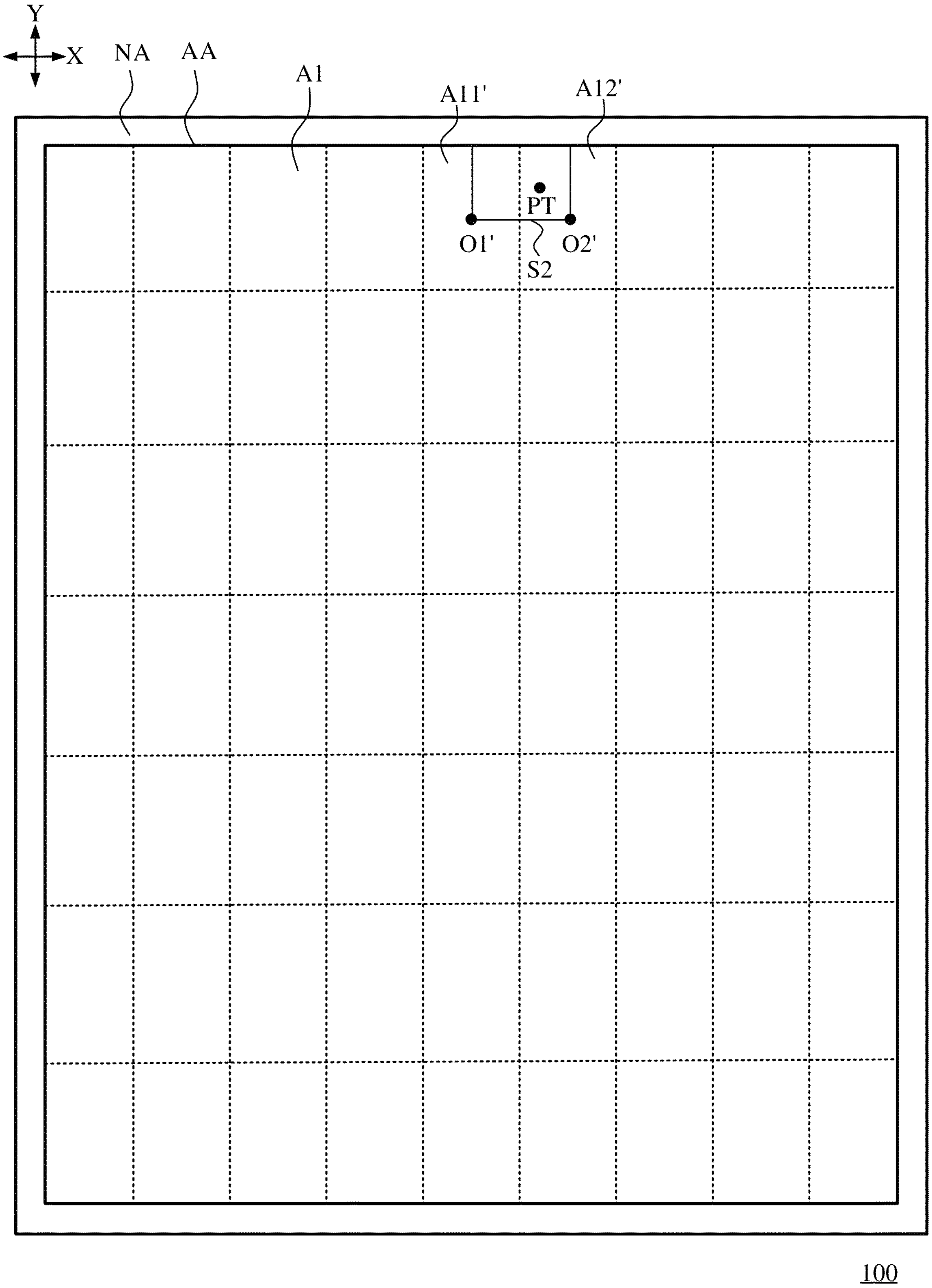
FIG. 4 shows a schematic diagram of selection of reference sub-display areas according to another embodiment of the present application.

FIG. 4 shows a schematic diagram of selection of reference sub-display areas according to an embodiment of the present application. As an example, the display panel 100 includes a display area AA and a non-display area NA. FIG. 4 exemplarily shows that the display area AA of the display panel is divided into sub-display areas A1 of 7 rows and 9 columns. The two sub-display areas of 1 row and 2 columns are respectively the two reference sub-display areas A11', A12', the center points of the two reference sub-display areas A11', A12' are O1' and O2' respectively, and the second rectangular area S2 is formed by a line connecting the center points O1' and O2' and an edge of the display area parallel to the line. The target sub-pixel PT is located in the second rectangular area S2. The two reference sub-display areas A11', A12' are distributed in an array of 1 row and 2 columns, that is, the distance between the center points of the two reference sub-display areas A11', A12' in the column direction Y is zero.

In some optional embodiments, as shown in FIG. 4, in the case that the line and the edge of the display area forming the second rectangular area are parallel in the row direction X, the weight factor for each of the reference sub-display areas may be calculated according to formula (3):

$$f' = \left(1 - \frac{h'}{H}\right) \quad \text{formula (3)}$$

Here, f' represents the weight factor, h' represents a distance between the center point of the target sub-pixel and the center point of the reference sub-display area in the row direction X, H represents a distance between center points of adjacent reference sub-display areas in the row direction X.

As known from the above formula (3), the weight factor for the reference sub-display area A11' may be calculated according to formula (3.1):

$$f_1' = \left(1 - \frac{h_1'}{H}\right) \quad \text{formula (3.1)}$$

As known from the above formula (3), the weight factor for the reference sub-display area A12' may be calculated according to formula (3.2):

$$f_2' = \left(1 - \frac{h_2'}{H}\right) \quad \text{formula (3.2)}$$

Here, $h_1$' represents a distance between the center point of the target sub-pixel and the center point O1' of the reference sub-display area A11' in the row direction X, and $h_2$' represents a distance between the center point of the target sub-pixel and the center point O2' of the reference sub-display area A12' in the row direction X.

Further, in step 140, the target luminance value of the target sub-pixel under the target grayscale value may be calculated according to formula (2.1):

$$L_X = L_1' \times f_1' + L_2' \times f_2' \quad \text{formula (2.1)}$$

Here, $L_X$ represents the target luminance value, $L_1$' represents an average luminance value of the reference sub-display area A11', $f_1$' represents a weight factor for the reference sub-display area A11', and $L_2$' represents an average luminance value of the reference sub-display area A12', $f_2$' represents a weight factor for the reference sub-display area A12'.

Figure 5:
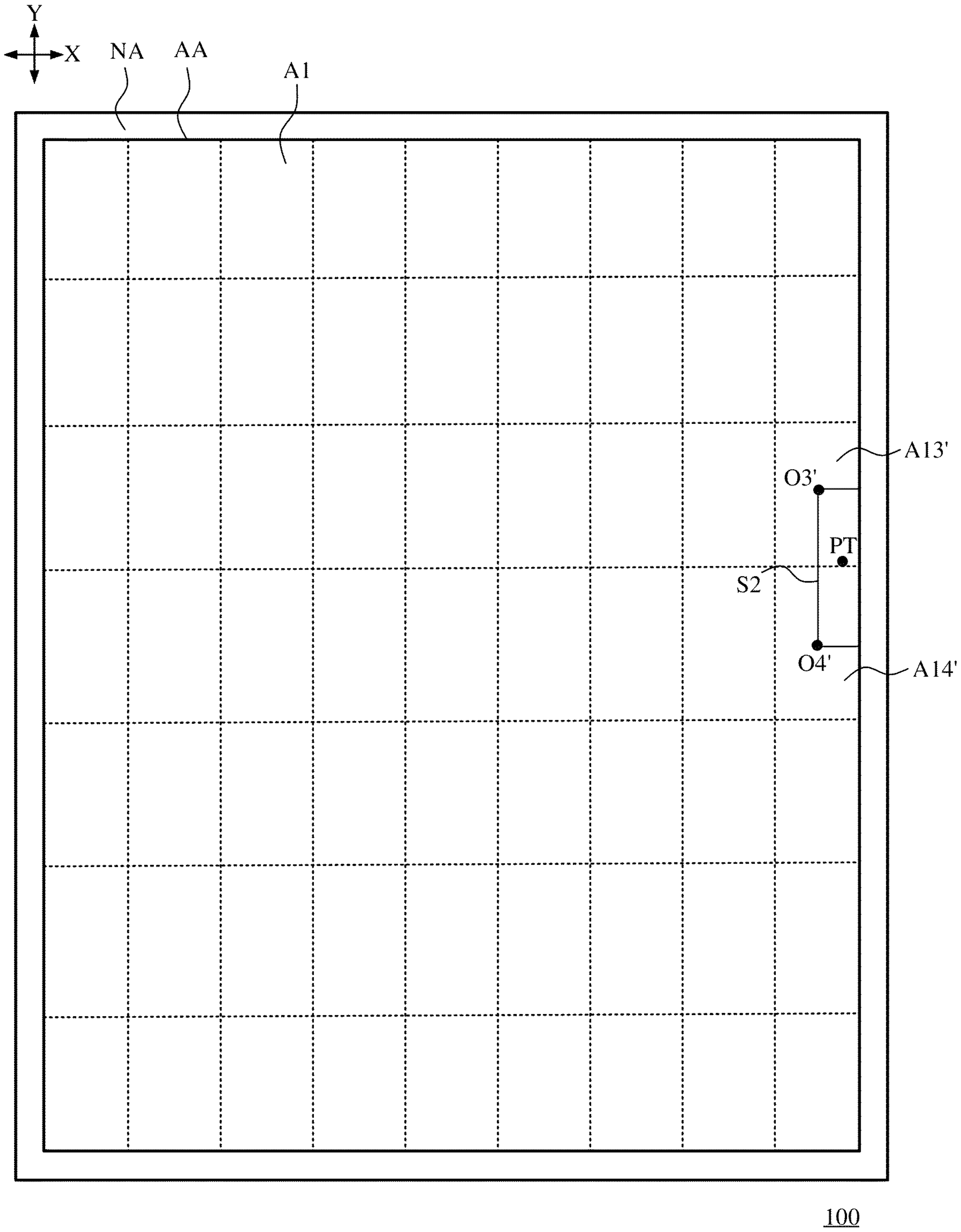
FIG. 5 shows a schematic diagram of selection of reference sub-display areas according to yet another embodiment of the present application.

FIG. 5 shows a schematic diagram of selection of reference sub-display areas according to an embodiment of the present application. As an example, the display panel 100 includes a display area AA and a non-display area NA. FIG. 5 exemplarily shows that the display area AA of the display panel is divided into sub-display areas A1 of 7 rows and 9 columns. The two sub-display areas of 2 rows and 1 column are respectively the two reference sub-display areas A13', A14', the center points of the two reference sub-display areas A13', A14' are O3' and O4' respectively, and the second rectangular area S2 is formed by a line connecting the center points O3' and O4' and an edge of the display area parallel to the line. The target sub-pixel PT is located in the second rectangular area S2. The two reference sub-display areas A13', A14' are distributed in an array of 2 rows and 1 columns, that is, the distance between the center points of the two reference sub-display areas A13', A14' in the row direction X is zero.

In some optional embodiments, as shown in FIG. 5, in the case that the line and the edge of the display area forming the second rectangular area are parallel in the column direction Y, the weight factor for each of the reference sub-display areas may be calculated according to formula (4):

$$f' = \left(1 - \frac{v'}{V}\right) \quad \text{formula (4)}$$

Here, f' represents the weight factor, v' represents a distance between the center point of the target sub-pixel and the center point of the reference sub-display area in the column direction Y, V represents a distance between center points of adjacent reference sub-display areas in the column direction Y.

As known from the above formula (4), the weight factor for the reference sub-display area A13' may be calculated according to formula (4.1):

$$f_3' = \left(1 - \frac{v_3'}{V}\right) \quad \text{formula (4.1)}$$

As known from the above formula (4), the weight factor for the reference sub-display area A14' may be calculated according to formula (4.2):

$$f_4' = \left(1 - \frac{v_4'}{V}\right) \quad \text{formula (4.2)}$$

Here, $v_3$' represents a distance between the center point of the target sub-pixel and the center point O3' of the reference sub-display area A13' in the column direction Y, and $v_4$' represents a distance between the center point of the target sub-pixel and the center point O4' of the reference sub-display area A14' in the column direction Y.

Further, in step 140, the target luminance value of the target sub-pixel under the target grayscale value may be calculated according to formula (2.2):

$$L_X = L_3' \times f_3' + L_4' \times f_4' \quad \text{formula (2.2)}$$

Here, $L_X$ represents the target luminance value, $L_3$' represents an average luminance value of the reference sub-display area A13', $f_3$' represents a weight factor for the reference sub-display area A13', and $L_4$' represents an average luminance value of the reference sub-display area A14', $f_4$' represents a weight factor for the reference sub-display area A14'.

In some optional embodiments, in step 150, the compensation grayscale value of the target sub-pixel under the target grayscale value may be calculated according to formula (5):

$$N_X = N \times (L_X/L_N)^{\frac{1}{Gamma}} \qquad \text{formula (5)}$$

Here, Nx represents the compensation grayscale value, N represents the target grayscale value, $L_X$ represents the target luminance value, $L_N$ represents an actual luminance value of the target sub-pixel under the target grayscale value, and Gamma represents a gamma value of the display panel.

According to the above formula (5), the desired compensation grayscale value can be obtained accurately.

It can be understood that $L_N$ is an actual luminance value of the sub-pixel before compensation.

Figure 6:
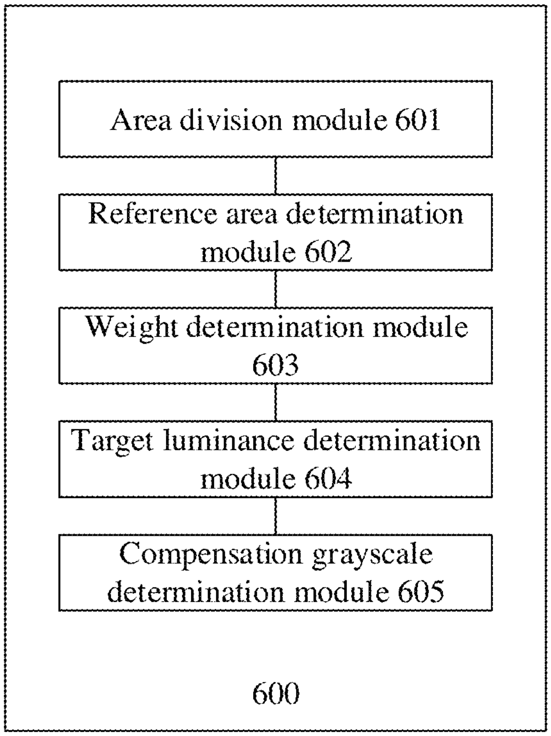
FIG. 6 shows a schematic structural diagram of an apparatus for determining a compensation grayscale according to an embodiment of the present application.

FIG. 6 shows a schematic structural diagram of an apparatus for determining a compensation grayscale according to an embodiment of the present application. As shown in FIG. 6, the apparatus 600 for determining the compensation grayscale provided by the embodiment of the present application includes an area division module 601, a reference area determination module 602, a weight determination module 603, a target luminance determination module 604 and a compensation grayscale determination module 605.

The area division module 601 may be configured to divide a display area of a display panel into a plurality of sub-display areas distributed in an array.

The reference area determination module 602 may be configured to select at least two sub-display areas from the plurality of sub-display areas as reference sub-display areas. T the reference sub-display areas are adjacent to each other and one of the reference sub-display areas includes a target sub-pixel to be compensated.

The weight determination module 603 may be configured to determine a weight factor for each of the reference sub-display areas according to a distance between a center point of the target sub-pixel and a center point of the reference sub-display area and a distance between center points of adjacent reference sub-display areas.

The target luminance determination module 604 may be configured to calculate a weighted sum of average luminance values of the reference sub-display areas under a target grayscale value with the weight factors for the reference sub-display areas to obtain a target luminance value of the target sub-pixel under the target grayscale value.

The compensation grayscale determination module 605 may be configured to determine a compensation grayscale value of the target sub-pixel under the target grayscale value according to the target luminance value.

According to the embodiments of the present application, the target luminance value of the target sub-pixel to be compensated under the target grayscale value is determined according to a weighted sum of the average luminance values of the reference sub-display areas with the weight factors for the reference sub-display areas, the reference sub-display areas are adjacent to each other and one of the reference sub-display areas includes the target sub-pixel, that is, the reference sub-display areas are located around the target sub-pixel, and the weight factor for each of the reference sub-display areas is determined according to a distance between a center point of the target sub-pixel and a center point of the reference sub-display area and a distance between center points of adjacent reference sub-display areas. Therefore, it may be possible to avoid taking the average luminance value determined by luminance data acquired by the luminance acquisition device as the target luminance value, and thus avoid overcompensation for the sub-pixels at two ends of the same row so as to address the problem of color deviation of the display panel.

In some optional embodiments, the sub-display areas are rectangular areas each having equal lengths and equal widths.

In some optional embodiments, the target sub-pixel is located in a first rectangular area formed by taking the center points of four sub-display areas in two rows and two columns as vertices, and the reference area determination module 602 may be specifically configured to select four sub-display areas from the plurality of sub-display areas as the reference sub-display areas. Here, the four sub-display areas having the center points that are respectively four vertices of the first rectangular area are selected as the reference sub-display areas.

In some optional embodiments, the weight determination module 603 may be specifically configured to calculate the weight factor for each of the reference sub-display areas according to the above formula (1).

In some optional embodiments, the four reference sub-display areas include a first reference sub-display area, a second reference sub-display area, a third reference sub-display area and a fourth reference sub-display area, and the target luminance determination module 604 may be specifically configured to calculate the target luminance value according to the above formula (2).

In some optional embodiments, the target sub-pixel is located in a second rectangular area formed by a line connecting the center points of two adjacent sub-display areas and an edge of the display area parallel to the line, and the reference area determination module 602 may be specifically configured to select two sub-display areas from the plurality of sub-display areas as the reference sub-display areas. Here, the two sub-display areas having the center points that are respectively two endpoints of the line are selected as the reference sub-display areas.

In some optional embodiments, the weight determination module 603 may be specifically configured to: calculate the weight factor for each of the reference sub-display areas according to the above formula (3) in the case that the line and the edge of the display area forming the second rectangular area are parallel in a row direction; and calculate the weight factor for each of the reference sub-display areas according to the above formula (4) in the case that the line and the edge of the display area forming the second rectangular area are parallel in a column direction.

In some optional embodiments, the compensation grayscale determination module 605 may be specifically configured to calculate the compensation grayscale value of the target sub-pixel under the target grayscale value according to the above formula (5).

Figure 7:
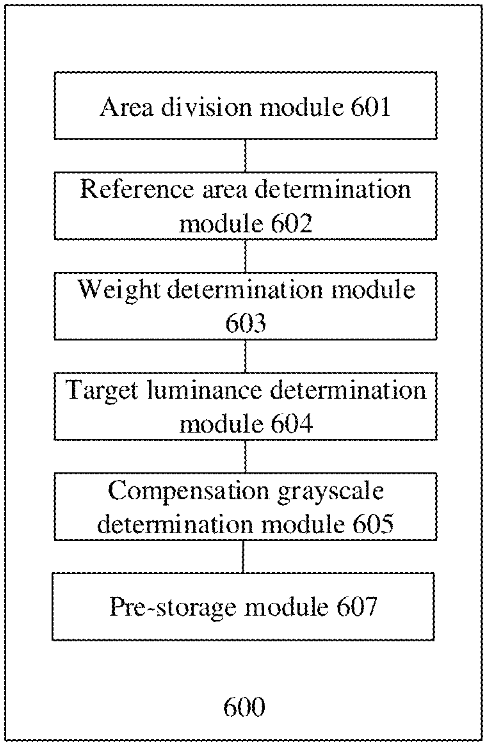
FIG. 7 shows a schematic structural diagram of an apparatus for determining a compensation grayscale according to another embodiment of the present application.

In some optional embodiments, referring to FIG. 7, the apparatus 600 for determining the compensation grayscale provided by the embodiment of the present application may further include a pre-storage module 607. The pre-storage module 607 may be configured to store the compensation grayscale value in the storage module of the display panel to be compensated.

The apparatus for determining the compensation grayscale in the embodiment of the present application may be an apparatus, or may be a component, an integrated circuit, or a chip in a terminal. The apparatus may be a mobile electronic device or a non-mobile electronic device. Exemplarily, the mobile electronic device may be a mobile phone, a tablet computer, a notebook computer, a palmtop computer, a vehicle electronic device, a wearable device, an ultra-mobile personal computer (UMPC), a netbook or a personal digital assistant (PDA), etc., non-mobile electronic device may be a server, a network attached storage (NAS), a personal computer (PC), a television (TV), a teller machine or a self-service machine, etc., which are not specifically limited in the embodiment of the present application.

The apparatus for determining the compensation grayscale in the embodiment of the present application may be an apparatus having an operating system. The operating system may be an Android operating system, an IOS operating system, or other possible operating systems, which are not specifically limited in the embodiment of the present application.

Figure 8:
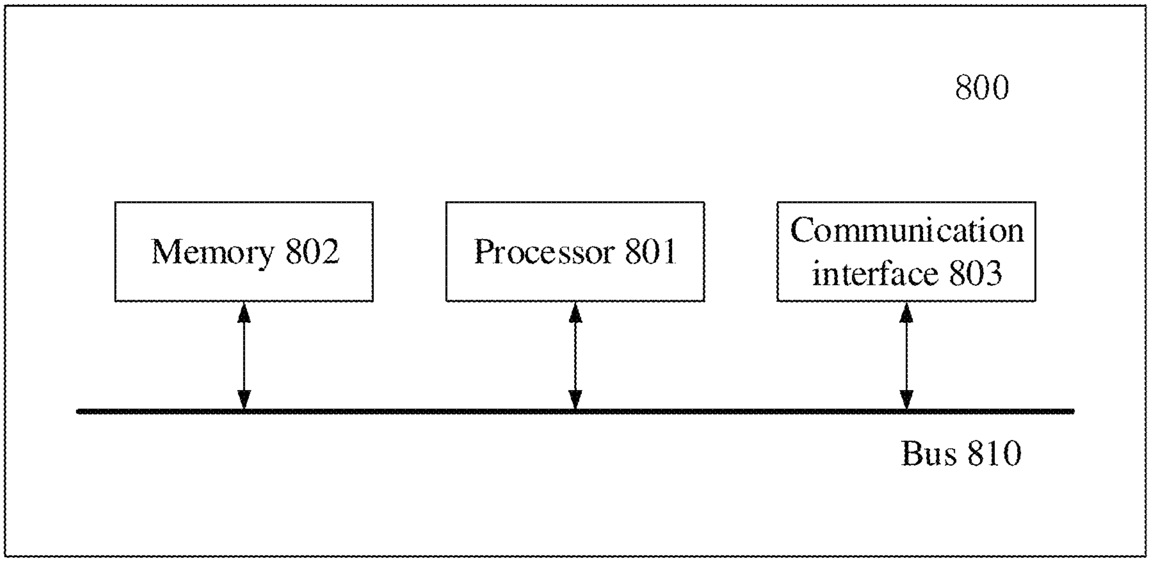
FIG. 8 shows a schematic structural diagram of a device for determining a compensation grayscale according to an embodiment of the present application.

FIG. 8 shows a schematic diagram of a hardware structure of a device for determining a compensation voltage provided by an embodiment of the present application.

The device for determining the compensation voltage may include a processor 801 and a memory 802 storing computer program instructions.

Specifically, the above-mentioned processor 801 may include a central processing unit (CPU) or an application specific integrated circuit (ASIC) or may be configured as one or more integrated circuits implementing the embodiments of the present application.

The memory 802 may include a mass storage for data or instructions. For example and without limitation, the memory 802 may include a hard disk drive (HDD), a floppy disk drive, a flash memory, an optical disk, a magneto-optical disk, a magnetic tape, or a universal serial bus (USB) drive, or a combination of two or more thereof. Where appropriate, the memory 802 may include a removable or non-removable (or fixed) medium. Where appropriate, the memory 802 may be inside or outside a comprehensive gateway disaster recovery device. In a particular embodiment, the memory 802 is a non-volatile solid-state memory. In a particular embodiment, the memory 802 may include a read only memory (ROM). Where appropriate, the ROM may be a mask-programmed ROM, a programmable ROM (PROM), an erasable PROM (EPROM), an electrically erasable PROM (EEPROM), an electrically rewriteable ROM (EAROM), or a flash memory or a combination of two or more thereof.

The processor 801 may implement any method for determining the compensation voltage in the above-mentioned embodiments by reading and executing the computer program instructions stored in the memory 802.

In an example, the device for determining the compensation voltage may further include a communication interface 803 and a bus 810. As shown in FIG. 8, the processor 801, the memory 802, and the communication interface 803 are connected through the bus 810 and communicate with each other.

The communication interface 803 is mainly configured to implement communication between various modules, apparatuses, units and/or devices in the embodiments of the present application.

The bus 810 includes hardware, software, or both, and couples the components of the device for determining the compensation voltage to each other. By way of example and without limitation, the bus may include an accelerated graphics port (AGP) or other graphics bus, an enhanced industry standard architecture (EISA) bus, a front side bus (FSB), a hyper transport (HT) interconnection, an industry standard architecture (ISA) bus, an unlimited bandwidth interconnection, a low pin count (LPC) bus, a memory bus, a microchannel architecture (MCA) bus, a peripheral component interconnection PCI bus, a PCI-Express (PCI-X) bus, a serial advanced technology attachment (SATA) bus, a video electronics standards association local (VLB) bus or other suitable bus, or a combination of two or more thereof. Where appropriate, the bus 810 may include one or more buses. Although the embodiments of the present application describe and show a specific bus, the present application considers any suitable bus or interconnect.

The device for determining the compensation grayscale can implement the method for determining the compensation grayscale in the embodiment of the present application, thereby realizing the method for determining the compensation grayscale and the apparatus for determining the compensation grayscale described in conjunction with FIG. 2 and FIG. 6.

The embodiments of the present application further provide a computer-readable storage medium having a computer program stored thereon. The computer program, when executed by a processor, implements the method for determining the compensation grayscale in the above-mentioned embodiments, which can achieve the same technical effect. In order to avoid repetition, details are not repeated here. The computer-readable storage medium may include a read-only memory (ROM), a random access memory (RAM), a magnetic disk or an optical disk, which are not limited herein.

In accordance with the embodiments of the present application as described above, these embodiments do not exhaust all the details and do not limit the present application merely as the described specific embodiments. Obviously, many modifications and variations may be made in light of the above description. These embodiments are selected and specifically described in this specification to better explain the principles and the practical applications of the present application, so that those skilled in the art can make good use of the present application and modifications based on the present application. The present application is to be limited only by the claims along with their full scope and equivalents.

What is claimed is:

1. A method for determining a compensation grayscale, the method comprising:

dividing a display area of a display panel into a plurality of sub-display areas distributed in an array;

selecting at least two sub-display areas from the plurality of sub-display areas as reference sub-display areas, wherein the reference sub-display areas are adjacent to each other and one of the reference sub-display areas comprises a target sub-pixel to be compensated;

determining a weight factor for each of the reference sub-display areas according to a distance between a center point of the target sub-pixel and a center point of each reference sub-display area and a distance between center points of adjacent reference sub-display areas;

calculating a weighted sum of average luminance values of the reference sub-display areas under a target grayscale value with the weight factors for the reference sub-display areas to obtain a target luminance value of the target sub-pixel under the target grayscale value; and determining a compensation grayscale value of the target sub-pixel under the target grayscale value according to the target luminance value.

2. The method according to claim 1, wherein each of the plurality of sub-display areas is a regular polygon area with equal sides.

3. The method according to claim 2, wherein each of the sub-display areas is rectangular, the target sub-pixel is located in a first rectangular area formed by taking center points of four sub-display areas in two rows and two columns as vertices, and selecting the at least two sub-display areas from the plurality of sub-display areas as the reference sub-display areas further comprises:

selecting four sub-display areas from the plurality of sub-display areas as the reference sub-display areas, wherein the four sub-display areas having the center points that are respectively four vertices of the first rectangular area are selected as the reference sub-display areas.

4. The method according to claim 3, wherein determining the weight factor for each of the reference sub-display areas according to the distance between the center point of the target sub-pixel and the center point of each reference sub-display area and the distance between the center points of the adjacent reference sub-display areas further comprises:

calculating the weight factor for each of the reference sub-display areas according to formula (1):

$$f=\left(1-\frac{h}{H}\right)\times\left(1-\frac{v}{V}\right) \quad \text{formula (1)}$$

wherein f represents the weight factor, h represents a distance between the center point of the target sub-pixel and the center point of the reference sub-display area in a row direction, H represents a distance between center points of adjacent reference sub-display areas in the row direction, v represents a distance between the center point of the target sub-pixel and the center point of the reference sub-display area in a column direction, and V represents a distance between center points of the adjacent reference sub-display areas in the column direction.

5. The method according to claim 4, wherein the four reference sub-display areas comprise a first reference sub-display area, a second reference sub-display area, a third reference sub-display area and a fourth reference sub-display area, and calculating the weighted sum of the average luminance values of the reference sub-display areas under the target grayscale value with the weight factors for the reference sub-display areas to obtain the target luminance value of the target sub-pixel under the target grayscale value further comprises:

calculating the target luminance value according to formula (2):

$$L_X=L_1\times f_1+L_2\times f_2+L_3\times f_3+L_4\times f_4 \quad \text{formula (2)}$$

wherein $L_X$ represents the target luminance value, $L_1$ represents an average luminance value of the first reference sub-display area, $f_1$ represents a weight factor for the first reference sub-display area, $L_2$ represents an average luminance value of the second reference sub-display area, $f_2$ represents a weight factor for the second reference sub-display area, $L_3$ represents an average luminance value of the third reference sub-display area, $f_3$ represents a weight factor for the third reference sub-display area, $L_4$ represents an average luminance value of the fourth reference sub-display area, and $f_4$ represents a weight factor for the fourth reference sub-display area.

6. The method according to claim 2, wherein the target sub-pixel is located in a second rectangular area formed by a line connecting the center points of two adjacent sub-display areas and an edge of the display area parallel to the line, and selecting the at least two sub-display areas from the plurality of sub-display areas as the reference sub-display areas further comprises:

selecting two sub-display areas from the plurality of sub-display areas as the reference sub-display areas, wherein the two sub-display areas having the center points that are respectively two endpoints of the line are selected as the reference sub-display areas.

7. The method according to claim 6, wherein determining the weight factor for each of the reference sub-display areas according to the distance between the center point of the target sub-pixel and the center point of each reference sub-display area and the distance between center points of the adjacent reference sub-display areas further comprises:

if the line and the edge of the display area forming the second rectangular area are parallel in a row direction, calculating the weight factor for each of the reference sub-display areas according to formula (3):

$$f'=\left(1-\frac{h'}{H}\right) \quad \text{formula (3)}$$

if the line and the edge of the display area forming the second rectangular area are parallel in a column direction, calculating the weight factor for each of the reference sub-display areas according to formula (4):

$$f'=\left(1-\frac{v'}{V}\right) \quad \text{formula (4)}$$

wherein f' represents the weight factor, h' represents a distance between the center point of the target sub-pixel and the center point of the reference sub-display area in the row direction, H represents a distance between center points of adjacent reference sub-display areas in the row direction, v' represents a distance between the center point of the target sub-pixel and the center point of the reference sub-display area in the column direction, and V represents a distance between center points of adjacent reference sub-display areas in the column direction.

8. The method according to claim 1, wherein determining the compensation grayscale value of the target sub-pixel under the target grayscale value according to the target luminance value further comprises:

calculating the compensation grayscale value of the target sub-pixel under the target grayscale value according to formula (5):

$$N_X=N\times\left(L_X/L_N\right)^{\frac{1}{Gamma}} \quad \text{formula (5)}$$

wherein Nx represents the compensation grayscale value, N represents the target grayscale value, $L_X$ represents the target luminance value, $L_N$ represents an actual luminance value of the target sub-pixel under the target grayscale value, and Gamma represents a gamma value of the display panel.

9. The method according to claim 1, wherein dividing the display area of the display panel into the plurality of sub-display areas distributed in the array further comprises:

dividing the display area of the display panel into the sub-display areas distributed in an array of m rows and n columns, where m and n are both positive integers greater than or equal to 2, wherein values of m and n are set from small to large until the display panel has no color deviation under the values of m and n.

10. The method according to claim 1, wherein the distance between the center point of the target sub-pixel and the center point of each of the reference sub-display areas comprises the distance between the center point of the target sub-pixel and the center point of each reference sub-display area in at least one direction of a row direction and a column direction; and the distance between the center points of the adjacent reference sub-display areas comprises the distance between the center points of the adjacent reference sub-display areas in at least one direction of the row direction and the column direction.

11. The method according to claim 1, wherein, before calculating the weighted sum of the average luminance values of the reference sub-display areas under the target grayscale value with the weight factors for the reference sub-display areas, the method further comprises:

acquiring a luminance value of each sub-pixel in each of the reference sub-display areas under the target grayscale value; and determining the average luminance value of each of the reference sub-display areas according to the luminance value of each sub-pixel in the reference sub-display area under the target gray scale value.

12. The method according to claim 11, wherein determining the average luminance value of each of the reference sub-display areas according to the luminance value of each sub-pixel in the reference sub-display area under the target grayscale value further comprises:

filtering the luminance values of the sub-pixels that have an obvious deviation under the target grayscale value; and calculating a ratio of a sum of the luminance values left after filtering to a number of the luminance values left after filtering to obtain the average luminance value of each of the reference sub-display areas.

13. The method according to claim 7, wherein determining the weight factor for each of the reference sub-display areas according to the distance between the center point of the target sub-pixel and the center point of each reference sub-display area and the distance between the center points of the adjacent reference sub-display areas further comprises:

calculating the weight factor for each of the reference sub-display areas according to formula (2.1):

$$L_X = L_1' \times f_1' + L_2' \times f_2' \quad \text{formula (2.1)}$$

wherein $L_X$ represents the target luminance value, $L_1'$ represents an average luminance value of one of the reference sub-display areas, $f_1'$ represents a weight factor for the one of the reference sub-display areas, $L_2'$ represents an average luminance value of another one of the reference sub-display areas, and $f_2'$ represents a weight factor for the another one of the reference sub-display areas.

14. A device for determining a compensation grayscale, comprising a processor, a memory, and a computer program stored on the memory and executable on the processor, wherein the computer program, when executed by the processor, implements the method according to claim 1.

* * * * *